United States Patent Office 3,657,136
Patented Apr. 18, 1972

3,657,136
METHOD OF CONTROLLING FOAM IN ACRYLONITRILE PRODUCTION
Hillel Lieberman, Andalusia, and John W. Henderson, Philadelphia, Pa., assignors to Betz Laboratories, Inc., Trevose, Pa.
No Drawing. Continuation-in-part of abandoned application Ser. No. 809,931, Mar. 24, 1969. This application Dec. 29, 1969, Ser. No. 888,813
Int. Cl. B01d
U.S. Cl. 252—321
10 Claims

ABSTRACT OF THE DISCLOSURE

The present disclosure is directed to a method of defoaming and inhibiting foam formation experienced in acrylonitrile production systems. The method of process generally comprises in its broadest sense, adding to said system a composition comprising at least one hydrocarbon oil, at least one alkaline earth metal hydroxide and at least one fatty acid containing from about 12 to about 22 carbon atoms. The composition may also contain water and a polyether polyol. The composition, of course, is added to said systems in an amount sufficient to control the foam.

---

This application is a continuation-in-part application of copending application Ser. No. 809,931, filed Mar. 24, 1969 now abandoned.

BACKGROUND OF THE INVENTION

In the past decade one of the compounds which has found extensive use as a basic compound in the preparation of polymeric materials for fiber production, for use in nitrile rubber production, and for use as coagulants and dispersants in the water treatment industry is acrylonitrile. Because of this interest, production facilities have been redesigned in order to keep up with the newer production demands and the newer and faster production processes. One of the earliest processes for producing this compound entailed the dehydration of ethylene chlorohydrin made by combining ethylene oxide with hydrocyanic acid. In more recent years the trend has been to utilize the combination of hydrocyanic acid and acetylene. The reaction, according to this process, takes place in a liquid phase with various metal salts such as copper salts as catalysts. Although these processes are still in use, perhaps with variations, additional processes utilizing, for example, the reaction of propylene and ammonia in the presence of oxygen yielding acrylonitrile and water have been found to be highly satisfactory. The latter mentioned process has been most effective since good yields of acrylonitrile are obtained, together with the desirable feature of recovering valuable by-products such as acetonitrile and hydrogen cyanide. This process commonly referred to as the Sohio acrylonitrile process and what is described in Chemical Engineering Progress, vol. 56, No. 10, pp. 65–67, consists of a catalytic, vapor phase, one-step conversion that is operated at moderate temperatures (below 500° C.) and at ordinary pressures. The catalyst depends for its activity upon a high concentration of active ingredients rather than trace constituents. As with the earlier processes after conversion or reaction, the reaction medium is subjected to various stages for product recovery and purification which may include such techniques as stripping and absorption and in some cases, plain distillation. At this point of the process, the reaction medium contains a whole host of different compounds and, because of the recovery and purification steps, the medium is subjected to some agitation. It is because of these conditions that foam formation becomes a problem and does have a drastic effect upon the efficiency, production rate, and consequently the economics of the respective processes. Accordingly, the demand in this regard for a foam controlling composition which will not only permit effective control of foam, but also one which will not affect either the purity of the acrylonitrile or the purity of the recoverable by-products. Moreover, the composition must be capable of functioning at temperatures above 200° F. and to do so without decomposing to the extent that additional impurities are imparted to the recovered products. Therefore, it can be appreciated that formulating a composition that meets all of the aforementioned prerequisites presented a formidable task. However, the present inventors studied the situation very carefully and discovered that if a composition comprising (i) at least one hydrophobic hydrocarbon oil, (ii) at least one alkaline earth metal hydroxide and (iii) at least one fatty acid containing from 12 to 22 carbon atoms was added to the acrylonitrile production system that foam which was commonly experienced could be controlled to the extent that production rate demands could be maintained. It was also discovered that satisfactory results could be achieved when the composition contained water and/or a polyether polyol having a molecular weight of from about 1000 to 2000.

In addition to the above mentioned primary constituents, surfactants such as the sodium salts of sulfonated oleic acids, the sodium salts of di-2-ethylhexylsulfosuccinate, the oleate esters of glycols and the fatty acid esters of polyethylene glycol can be added to the composition in order to assure uniform and rapid distribution of the composition throughout the acrylonitrile system.

These surfactants can advantageously be included in the composition at concentrations which equal from 0.25 to about 1% by weight of the composition.

The hydrocarbon oils which can be used according to the invention include those liquid hydrocarbons which are aliphatic, alicyclic, or aromatic in nature. In addition, mixtures of these hydrocarbons have also been found to be operable. The liquid hydrocarbons are liquids at room temperature in atmospheric pressure, and should preferably have a viscosity of from about 30 SUS to 400 SUS (Saybolt Universal Seconds at 100° F.), and a minimum boiling point of at least 150° F. Liquid hydrocarbons of this type generally contain from about 6 to 25 carbon atoms and are exemplified with such hydrocarbons as benzene, hexane, heptane, octane, mineral seal oil, naphtha, naphthenic mineral oil, paraffinic oil and mineral oil, etc. The hydrocarbon or mixtures of hydrocarbon are preferably included in the composition to the extent of from about 70 to about 95% by weight of the composition.

The alkaline earth metal hydroxide, i.e., the hydroxides of calcium, magnesium and barium, is included in the composition in an amount ranging from 0.25 to about 5% by weight and preferably from about 1 to 2% by weight. The composition may contain any one of or a mixture of the hydroxides.

The fatty acids are included in the composition in an amount which represents from about 0.2 to about 20% by weight of the composition and preferably about 4 to 10% by weight. The fatty acids which are operable for the present purpose are the fatty acids which contain from 12 to 22 carbon atoms and include such acids as lauric, tridecylic, myristic, palmitic, stearic, oleic, linoleic, linolenic and behenic acids or mixtures thereof.

The polyether polyols can be included in the composition in an amount of from about 0.2 to about 10% by weight. Preferably, these polyols possess a molecular weight of between 1000 to 2000. One such polyol which has been found to be quite suitable is a polyether triol (more specifically, polyoxyethylene triol) which possesses a molecular weight of approximately 1500 and is sold by Union Carbide as Niax Polyol LHT 42.

Although defoaming compositions which contain the respective components in the proportions as prescribed above have all found successful use, the preferred compositions of the invention are those wherein the alkaline earth metal hydroxide or mixture thereof is present in excess of its stoichiometric equivalent with respect to the fatty acid present. Most preferably this excess of hydroxide should represent a stoichiometric excess of from about 30 to 100%.

TEST PROCEDURES

In order to determine whether in fact the compositions used in accordance with the present invention were operable in controlling foam, various reaction samples were taken from an on-line production facility. In this particular system, conversion had already taken place. The process being used was that as outlined above where propylene and ammonia were reacted in the presence of oxygen to form acrylonitrile, water and the specified acetonitrile and hydrogen cyanide by-products. In this particular process the streams which were sampled included that being fed to a stripper where acetonitrile is removed overhead from the water which leaves through the bottom of the stripper. The stripper in this instance was being operated with a bottom temperature of 245° F. and a top pressure of 7 p.s.i.g. The bottom stream at which point the sample was taken flows to an absorber where any additional acetonitrile, acrylonitrile, hydrogen cyanide, and lesser components are absorbed in water. The temperature of the absorber was within the range of 65–100° F. with a top pressure of 10 p.s.i.g. The "rich" water from the absorber from which a sample was taken flows to a recovery column where acrylonitrile and hydrogen cyanide are separated overhead from most of the water, any remaining acetonitrile and some hydrogen cyanide which compose the bottom stream. A sample of this stream was also taken. The stream then is directed back to the stripper as feed. The recovery column possessed a bottom operating temperature of 225–230° F. with a top pressure of 2 to 5 p.s.i.g.

Foaming was occurring in all three towers but predominantly in the stripper and absorber.

TEST PROCEDURE—LABORATORY

In order to ascertain on a laboratory scale where in fact the composition would be effective as foam controlling agents in the subject system, a procedure was devised which assimilated as closely as possible the conditions as experienced in the actual towers of the facility. The samples taken from the respective columns were placed in a calibrated container and the container was placed under the conditions as utilized in the particular tower. The samples were agitated mildly by external force but upon heating additional agitation was produced. The volume of sample utilized was such as to measure 100 centimeters within the calibrated container. The samples were tested to establish the foam problems which would exist under the laboratory conditions. This was accomplished by adding the appropriate volume of sample to the container and try bringing the temperatures and pressure up to those existing in the column from which they were taken. The sample was observed and the foam rise over chosen intervals was noted. The calibrated container possessed a 300 cm. capacity consequently this was considered as maximum for the purpose of the test.

In order to ascertain the effect of the composition, a new sample was utilized to which had been added approximately 10 parts by weight per million parts by weight of sample of the foam controlling composition. The sample was then subjected to exactly the same conditions as the untreated sample and the foam rise was measured at the various time intervals to note whether in fact control was being maintained. The foam height was measured over a period of 120 seconds and compared with the foam height of the untreated samples. The results derived using the above described procedure are recorded in the following tables.

COMPOSITIONS

The compositions of the inventions can be prepared very simply by merely combining the chosen ingredients and heating with mixing to a temperature of from 160 to 220° F., and preferably 180–200° F. for a period ranging from 15 minutes to 120 minutes. As a guideline, the consistency of the reaction medium can be used as a gauge for the length of heating. The objective is to obtain a smooth and evenly mixed composition which flows easily at room temperatures.

SPECIFIC EMBODIMENTS

Having thus described the invention generally, specific embodiments thereof are set forth below. However, these embodiments are included as representative only and are not intended to be limitative of the invention.

EXAMPLE 1

The following compounds and materials in the designated percent by weight of total composition weight were mixed at room temperature.

2% of calcium hydroxide
9% of water
9% of a mixture of fatty acids with palmitic ($C_{16}$) and behenic ($C_{22}$) being present in major proportion (ninety percent with the $C_{16}$ and $C_{22}$ acids present in approximately a 1:1 ratio)
80% of a paraffinic hydrocarbon oil (Atlantic Corporation—Alpha Oil C with which possesses a specific gravity at 60° F. of .86 and a SSU viscosity of 150 at 100° F.

The resulting mixture was then heated to approximately 200° F. with stirring for a period of about 45 minutes. The resulting composition was then permitted to cool to room temperature.

EXAMPLE 2

The defoamer of this example was prepared in the same manner as in Example 1 with the exception that the concentrations of the constituents were as follows:

1.6% of calcium hydroxide
7.5% of the fatty acid mixture as set forth in Example 1
9.0% of water
81.9% of the oil as described in Example 1

EXAMPLE 3

The defoamer of this example was prepared according to the method as outlined in Example 1. The ingredients and the proportions thereof were the same with the exception of the fatty acid utilized. The fatty acid in this case was composed primarily of a mixture of palmitic acid and stearic acid.

EXAMPLES 4–5

The defoamers of Examples 4 and 5 were prepared in the same manner as set forth in Example 1 and contained the same proportions of the ingredients as set forth in Examples 1 and 2, respectively. The only difference between the compositions was that the oil used was Atlantic Corporation's Alpha-Oil B. This oil possesses a specific gravity of 0.857 at 60° F., an SSU viscosity of 105 at 100° F. and a boiling range of 650° F.

EXAMPLES 6–7

The defoamers of Examples 6 and 7 were prepared in the same manner as set forth in Example 1 and contained with the exception noted the same ingredients as set forth for Example 1. The composition of Example 6 contained in addition to the named ingredients 3% by weight of a polyoxyethylene triol having a molecular weight of approximately 1500 (Niax LHT 42). The oil in this instance was reduced to 77% by weight. The composition of Example 7 on the other hand contained 9% by weight of Niax LHT. The oil in this instance was reduced to 71% by weight.

FOAM CONTROLLING CAPACITY OF COMPOSITIONS

The foam controlling compositions were tested according to the procedure outlined earlier. The results in conjunction with the particular samples are set forth in following Table 1. The feed rate of the compositions were 10 parts by weight per million parts by weight of the sample.

TABLE 1

| Composition of— | Sample derivation | Foam height in centimeters after designated time intervals | | | |
|---|---|---|---|---|---|
| | | 30 sec. | 60 sec. | 90 sec. | 120 sec. |
| Control (no defoamer added). | Stripper | 290 | | | |
| Example 1 | do | 155 | 190 | 210 | 240 |
| Example 2 | do | 170 | 210 | 240 | 270 |
| Example 3 | do | 150 | 180 | 200 | 220 |
| Example 4 | do | 155 | 185 | 205 | 235 |
| Example 5 | do | 175 | 205 | 240 | 265 |
| Example 6 | do | 140 | 160 | 185 | 210 |
| Example 7 | do | 120 | 140 | 170 | 190 |
| Control (no defoamer added). | Absorber | 280 | | | |
| Example 1 | do | 140 | 165 | 190 | 215 |
| Example 2 | do | 170 | 195 | 220 | 255 |
| Example 3 | do | 145 | 170 | 190 | 225 |
| Example 4 | do | 140 | 160 | 190 | 220 |
| Example 5 | do | 140 | 165 | 185 | 210 |
| Example 6 | do | 120 | 140 | 165 | 190 |
| Example 7 | do | 105 | 120 | 145 | 160 |
| Control (no defoamer added). | Recovery column. | 210 | 290 | | |
| Example 1 | do | 135 | 150 | 195 | 205 |
| Example 2 | do | 145 | 160 | 200 | 210 |
| Example 3 | do | 135 | 145 | 185 | 200 |
| Example 4 | do | 135 | 150 | 195 | 205 |
| Example 5 | do | 140 | 155 | 195 | 205 |
| Example 6 | do | 110 | 130 | 155 | 170 |
| Example 7 | do | 105 | 120 | 130 | 145 |

CONCLUSIONS

From a perusal of the data recorded in the above table, it is clear that the compositions of the examples were more than satisfactory in controlling the foam experienced with the controls. In reviewing the results, it should be kept in mind that the chief objective of any antifoam composition is to completely inhibit foam formation and/or to completely cause the collapse of existing foam. However, as every worker in the art is aware, this objective is quite elusive and very seldom achieved and that the most that can be achieved in most instances is to control the degree of foam to the extent that production schedules can be maintained without impedence by the foam. Accordingly, in order to ascertain whether the compositions were capable of producing this effect, the compositions of Examples 1 and 6 were tested in the actual acrylonitrile production process described earlier and from what the samples tested in the laboratory were taken.

Two feed rates were used for each of the compositions. A feed rate of approximately 100 p.p.m. was utilized and the results were excellent in each instance. After this feed rate was shown to be satisfactory, the feed rate was reduced to 10 parts per million. Again, the respective compositions performed quite satisfactorily at this treatment level. These field trials proved conclusively that the compositions were effective for the purpose. From the actual field trials, it was determined that feed rates for the compositions were essentially determined by the throughput of the system. As can be appreciated, if the throughput is increased so is the propensity for foam formation. In any event, a feed rate of from about 1 to about 200 parts by weight of the composition per million parts by weight of the system will be sufficient to heat most of the systems encountered. The artisan would have no difficulty ascertaining the feed rate which would be satisfactory for his particular purpose.

EXAMPLES 8–12

The defoaming compositions of Examples 8 through 12 were formulated to illustrate the relative importance of formulating compositions which contained a stoichiometric excess of the hydroxide with respect to the fatty acid.

The defoaming composition of Example 1 was reproduced in each of these examples with the exception that the percentage by weight of hydroxide in the composition was changed to range from less than the stoichiometric equivalent to an excess of that equivalent. The differences in the percent by weight of the hydroxide were reflected in the lowering or increasing as the case might be, of the percent by weight of the water in the formulation. For the particular fatty mixture of Example 1, the stoichiometric equivalent was approximately 1%, i.e., it required 1 gram of hydroxide to neutralize 9 grams of the fatty acid mixture. The exact amount of the hydroxide contained in each of the formulations is recorded in Table 2 below. The samples which were treated with the compositions according to the procedure outlined earlier is also described in Table 2 which follows.

EXAMPLE 13

The defoaming composition of Example 6 was reproduced with the exception that the amount of hydroxide added was reduced to produce 0.73 equivalent of calcium hydroxide per equivalent of fatty acid. The composition obtained was tested using the "adsorber" sample and compared to the effects obtained using the composition of Example 6, which contains an excess of one equivalent of the hydroxide.

TABLE 2

| Composition of— | Equivalents of calcium hydroxide per equivalent of fatty acid | Derivation of sample treated | Foam height in centimeters after designated time intervals | | | |
|---|---|---|---|---|---|---|
| | | | 30 sec. | 60 sec. | 90 sec. | 120 sec. |
| Control (no defoamer added) | | Stripper | 290 | | | |
| Example 8 | 0.73 | do | 220 | 225 | 250 | 280 |
| Example 9 | 0.97 | do | 185 | 210 | 230 | 255 |
| Example 10 | 1.46 | do | 170 | 210 | 240 | 270 |
| Example 11 | 2.0 | do | 140 | 165 | 175 | 195 |
| Example 12 | 2.43 | do | 195 | 240 | 290 | |
| Control (no defoamer added) | | Absorber | 290 | | | |
| Example 8 | 0.73 | do | 200 | 210 | 255 | 285 |
| Example 9 | 0.97 | do | 195 | 215 | 245 | 265 |
| Example 10 | 1.46 | do | 165 | 190 | 210 | 255 |
| Example 11 | 2.00 | do | 140 | 165 | 195 | 210 |
| Example 12 | 2.43 | do | 200 | 255 | 295 | |
| Example 6 | 2.00 | do | 120 | 140 | 165 | 190 |
| Example 13 | 0.73 | do | 195 | 220 | 245 | 275 |

CONCLUSIONS

From the data recorded in Table 2, it was ascertained that the metal hydroxide content of the formulation had a direct effect upon the overall efficiency of the composition. Formulations which contained the metal hydroxide in an amount of about 30% to about 100% in excess of its stoichiometric equivalent with respect to the fatty acid were adjudged to be most satisfactory. The foregoing is equally true with respect to the formulations containing the polyether polyols. Upon field testing, the foregoing conclusions were confirmed.

The foregoing examples demonstrate the type compositions which were tested comprehensively. However, to test the overall concept, various compositions were made which contained the higher and lower concentration ranges disclosed for the respective ingredients. Moreover, in order to establish the results obtainable when various fatty acids were used in place of those of the specific examples and when various hydrocarbon oils were used in place of those of the specific examples, additional compositions were produced and tested. Moreover, the effects of the incorporation of surface active agents and the use of the different alkaline metal hydroxides were also studied in this manner. Compositions were also produced to ascertain the effect of varying the temperature and time of heating during their preparation. In every instance the composition produced exhibited upon testing effective foam controlling capacity. The concept was borne out by the testing and the worker in the art upon being appraised of the concept would have no difficulty in ascertaining which composition would serve his purpose performance and cost-wise.

Having thus described the invention, what is claimed is:

1. A method of defoaming and inhibiting foam formation generally experienced in acrylonitrile production systems which comprises adding to said system a quantity of product obtained by heating to a temperature of from about 160° to about 220° F. from about 15 to 120 minutes a composition comprising
   (i) from about 70% to about 95% by weight of at least one hydrocarbon oil;
   (ii) from about 0.25% to about 5% by weight of an alkaline earth metal hydroxide; and
   (iii) from about 0.2% to about 20% by weight of a fatty acid containing from about 12 to about 22 carbon atoms, wherein the alkaline earth metal hydroxide is present in said composition in an amount ranging from about 30% to about 100% in excess of its stoichiometric equivalent with respect to the said fatty acid.

2. A method according to claim 1 wherein the composition contains from about 3% to about 20% water.

3. A method according to claim 1 wherein the hydrocarbon oil is selected from the group consisting of aliphatic hydrocarbons, alicyclic hydrocarbons, aromatic hydrocarbons, and mixtures thereof, said alkaline earth metal hydroxide is selected from the group consisting of calcium hydroxide, magnesium hydroxide, and barium hydroxide, and said fatty acid is selected from the group consisting of lauric, tridecylic, myristic, palmitic, stearic, oleic, linoleic, linolenic, and behenic.

4. A method according to claim 3 wherein the composition contains from about 3% to about 20% by weight water.

5. A method according to claim 3 wherein the composition contains from about 0.25% to about 1% by weight of a polyether polyol surfactant having a molecular weight of from about 1000 to 2000.

6. A method according to claim 4 wherein the composition contains from about 0.25% to about 1% by weight of a polymer polyol surfactant having a molecular weight of from about 1000 to 2000.

7. A method according to claim 3 wherein the acrylonitrile system contains foam producing solids and said product is added to said system in an amount of from 1 to 200 parts per million parts by weight of said system.

8. A method according to claim 7 wherein said composition contains from about 0.2% to 10% by weight of a polyether polyol surfactant having a molecular weight of from about 1000 to 2000.

9. A method according to claim 8 wherein said composition contains from about 3% to about 20% by weight water.

10. A method according to claim 9 wherein the hydrocarbon oil is primarily a paraffinic oil, the fatty acid is stearic acid, said hydroxide is calcium hydroxide, and said polyol is polyoxyethylene triol having a molecular weight of about 1500.

References Cited
UNITED STATES PATENTS

| | | | |
|---|---|---|---|
| 1,957,513 | 5/1934 | Wolfson | 252—321 |
| 2,052,164 | 8/1936 | Buc | 252—321 |
| 2,575,298 | 11/1951 | Ryznar | 252—321 |
| 2,282,112 | 5/1942 | Bergstrom et al. | 252—321 |

JOHN D. WELSH, Primary Examiner

U.S. Cl. X.R.

252—358